United States Patent
Aleksic et al.

(10) Patent No.: US 6,957,329 B1
(45) Date of Patent: Oct. 18, 2005

(54) SYSTEM FOR ENCRYPTING DATA FROM MULTIPLE MULTIMEDIA APPLICATIONS AND METHOD THEREOF

(75) Inventors: Milivoje Aleksic, Richmond Hill (CA); Daniel Wai-Him Wong, North York (CA); Kenneth Man, North York (CA); Ivan Wong-Yin Yang, Markham (CA)

(73) Assignee: ATI Technologies, Inc., Thornhill (CA)

( * ) Notice: Subject to any disclaimer, the term of this patent is extended or adjusted under 35 U.S.C. 154(b) by 880 days.

(21) Appl. No.: 09/777,245

(22) Filed: Feb. 5, 2001

(51) Int. Cl.[7] .......................... H04L 9/00; H04K 1/00; H04N 7/167
(52) U.S. Cl. .............. 713/150; 713/151; 713/152; 713/153; 713/154; 713/201; 380/28; 380/29; 380/30; 380/200; 380/201; 380/255; 380/277; 380/283
(58) Field of Search .................... 713/150, 154, 713/201, 152, 151, 153; 380/200, 201, 277, 380/28, 29, 30, 255, 283

(56) References Cited

U.S. PATENT DOCUMENTS 6,236,727 B1 * 5/2001 Ciacelli et al. ............. 380/212
6,480,607 B1 * 11/2002 Kori et al. ................. 380/201

OTHER PUBLICATIONS

Matthew, He, "Studies on Computer Security and Encryption", 2001,polaris.nova.edu/MST/choices/matt.htm, pp. 1-18.*

* cited by examiner

*Primary Examiner*—Matthew Smithers
*Assistant Examiner*—Courtney Fields
(74) *Attorney, Agent, or Firm*—Toler, Larson & Abel, LLP (57) ABSTRACT

Methods and systems are provided for encrypting data from a plurality of multimedia devices. A driver initiates authentication for the plurality of multimedia applications. The driver assigns a key registers to each of the applications, based on available key registers. The applications use generated encryption key values to send data to be decrypted by their assigned key registers. The driver notifies video processing hardware of encryption seed keys to determine the generated encryption key values and hardware stores the value of corresponding decryption keys the assigned key registers. Each register can be used to exclusively decrypt data from an application of the plurality of applications. The driver directs the encrypted data from the applications to the video processing hardware. The video processing hardware decrypts the data and processes it into image data accordingly.

28 Claims, 4 Drawing Sheets

SYSTEM FOR ENCRYPTING DATA FROM MULTIPLE MULTIMEDIA APPLICATIONS AND METHOD THEREOF

FIELD OF THE INVENTION

The present invention relates generally to information handling systems and more particularly to encrypting communications within an information handling system.

BACKGROUND OF THE INVENTION

The entertainment industry is involved in a continual struggle to keep movies from being illegally copied. Unfortunately, the same technological advances that have made distributing high quality movies easier have made high quality illegal copies easier to produce. Of particular concern is the copying of high-bandwidth digital video content such as DVDs. Various methods have been employed to protect the content of DVDs from being copied illegally. One such method has been to equip DVD players with Macrovision, or a similar copy protection system. Common copy protection systems allow a media player to detect connections to multiple recording devices, and to scramble or otherwise alter the video data so that quality copies cannot be made. Because of the importance of preventing high quality copies from being made, a more secure form of copy protection, known as Content Scrambling System (CSS), was developed. Using CSS, the content of a DVD is encrypted, allowing the content of the DVD to be read only through the use of an encryption key stored on the DVD and a decryption key stored on the DVD player.

The use of encryption to protect DVDs from being illegally copied has been used much more frequently as DVD use has expanded. Many computers are being sold with built-in DVD-ROM drives and software players. While the content of the video and audio data in the DVD is encrypted, once the DVD player software has decoded the content, the content is decrypted and unsecured. The decoder must re-encrypt the content before submitting them to the video hardware. Video controllers can be made with stored keys that correspond to encryption keys on the decoder, allowing the content received to be decrypted and processed. However, the key cannot be shared amongst multiple decoders. Therefore, a system capable of securely handling data from multiple decoders would be advantageous.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE ILLUSTRATED EMBODIMENTS

At least one embodiment of the present invention provides a method for providing multiple channels of secure multimedia data. The method includes receiving a first authentication request from a first multimedia application and receiving a second authentication request from a second multimedia application. The second application is different from the first application. The method also includes assigning a first key register for the first application based upon the first authentication and assigning a second key register for the second application based upon the authentication. The method further includes receiving first encrypted data based upon a first encryption key from the first multimedia application and receiving second encrypted data based upon a second encryption key from the second multimedia application. The first and second encrypted data are for simultaneous real-time play back.

Another embodiment of the present invention provides for a method including receiving a first encrypted data from a plurality of applications. The applications include a first application assigned to a first key register and a second application assigned to a second key register. The method includes assigning a new (third) key register for decrypting data from the first application, based upon a request for re-authentication. The method also includes providing the first encrypted data, after the step of assigning the third key register, to the same decryption device. An advantage of at least one embodiment of the present invention is that data from multiple multimedia applications can be encrypted for simultaneous real-time play back. A further advantage of at least one embodiment of the present invention is that the amount of data to be dropped from processing, due to errors, can be minimized.

Figure 1:
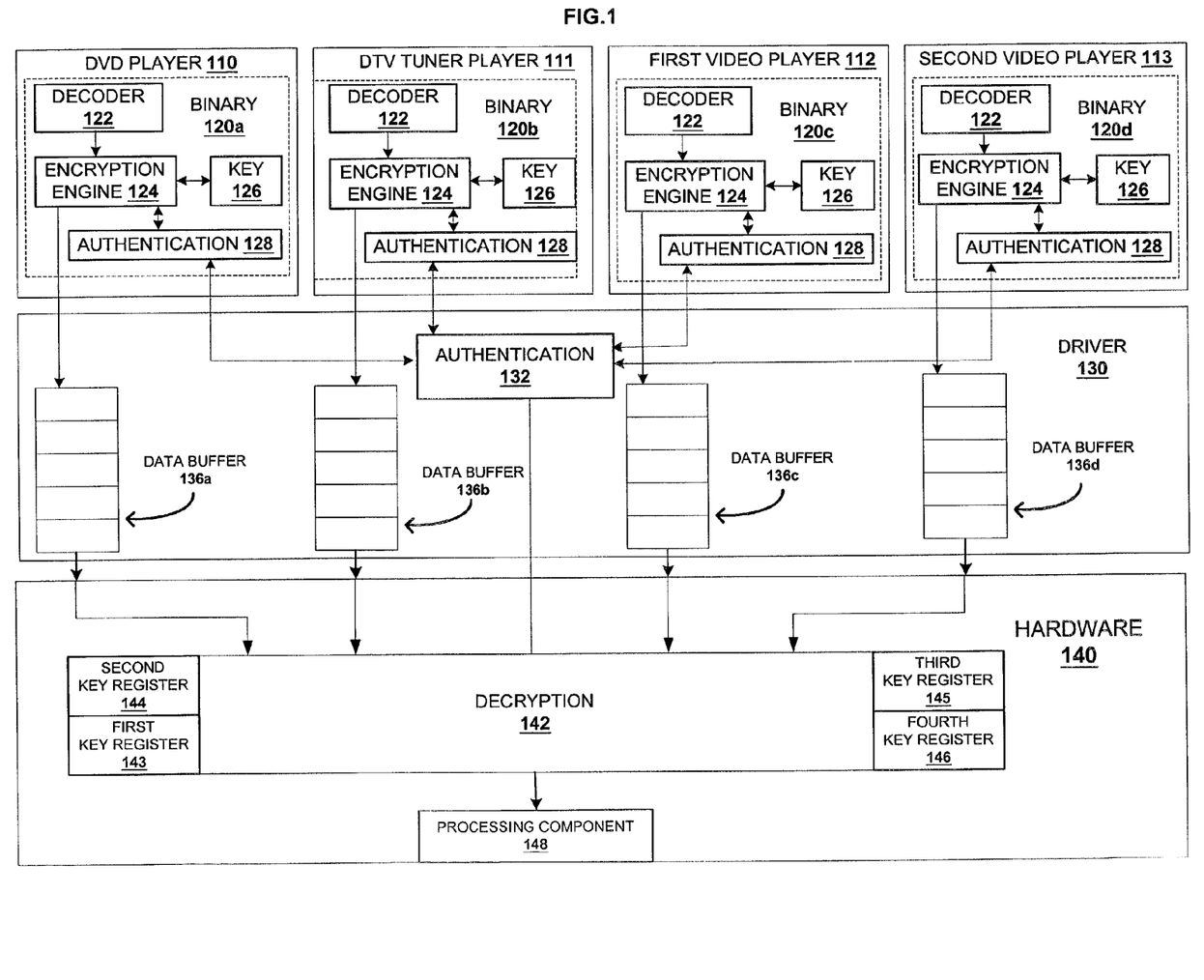
FIG. 1 is a block diagram illustrating a system for encrypting multiple channels of multimedia data for processing hardware, according to one embodiment of the present invention.

Referring now to FIG. 1, a system for handling and encrypting multiple channels of multimedia data is shown, according to one embodiment of the present invention. Data from multiple multimedia applications, such as a digital video disk (DVD) player 110, a digital television (DTV) tuner 111, a first video player 112, and a second video player 113, is encrypted using a different encryption key for each multimedia application 110–113. In one embodiment, driver 130 selects a different key register from key registers 143–146 in hardware 140 and assigns the key registers to the multimedia applications. In an alternate embodiment, driver 130 provides a key identifier, indicating which keys multimedia applications 110–113 are to use. Multimedia applications 110–113 and hardware 140 can use the identifier to choose among stored keys, such as encryption keys 126, for encrypting data intended for hardware 140. In one embodiment, multimedia applications 110–113, driver 130, and hardware 140 are part of an information handling system. A processor, such as a central processing unit (CPU—not shown), is used to run multimedia applications 110–113 and driver 130.

Multimedia applications, such as DVD player 110, DTV tuner 111, first video player 112, and second video player 113, receive video data from respective devices. For example, DVD player 110 receives video data from a DVD-ROM drive. DTV tuner 111 receives video data from a DTV tuner card. First video player 112 may be a video application receiving streaming video from the Internet. Second video player 113 may be a video application receiving streaming secured video from a surveillance system. In one embodiment, the video data includes motion compensation video data, as well as inverse discrete cosine transform (IDCT) coefficients.

In one embodiment, the multimedia applications 110–113 provide communication with the protected video sources, such as the DVD-ROM drive, the DTV tuner card, or a communications port. In one embodiment, multimedia applications 110–113 allow users to set their video preferences, such as selecting which portion of the videos to watch on the DVD-ROM drive, selecting which DTV channel to tune in to, or selecting which video feed to receive. Multimedia applications 110–113 can also provide video acceleration or processing of the video data received. DVD player 110 may also provide decryption of DVD video data, such as is provided through the Content Scrambling System (CSS). Other types of multimedia applications may also be used without departing from the scope of the invention.

In one embodiment, a binary file is provided to the developers of multimedia applications 110–113. Binary file 120*a* is provided to DVD player 110; binary file 120*b* is provided to DTV tuner 111, binary file 120*c* is provided to first video player 112; and binary file 120*d* is provided to second video player 113. Developers can include each of the binary files 120*a*–120*d* with multimedia applications 110–113, respectively, for decoding and encrypting video data. The binary files 120*a*–120*d* include a decoder 122 for translating video commands to hardware level commands, allowing them to be processed by hardware 140. For example, decoder 122 in DVD player 110 can process DVD video data to hardware commands that are understood by hardware 140. In one embodiment, different decoder components, such as decoder 122, are used for each of the binary files 120*a*–120*d*, to handle the variety of commands from their respective multimedia applications 110–113. In another embodiment, binary files 120*a*–120*d* are different instances of the same model.

Encryption engine 124 is used for encrypting data being sent to hardware 140. A seed key is generated through binary files 120*a*–120*d*. In one embodiment, the seed key is generated by authentication component 128, through the authentication negotiations with authentication engine 132. In another embodiment, the seed value is generated through key values in a list of encryption keys. In one embodiment, a final key value is generated through manipulation of the generated seed key and stored as key 126. Key 126 is assigned to encryption engine 124. Authentication component 128 communicates with an authentication engine 132, on driver 130, to determine which of the available key registers 143–146 in hardware 140 to use. The selection of the key registers 143–146 may also depend on key registers 143–146 already chosen for other applications, wherein the multimedia applications 110–113 are assigned unique key registers in hardware 140. The value of the final key, key 126 is used to encrypt the data generated by decoder 122.

Encryption engine 124 can encode transmissions to hardware 140 with a mathematical transformation, such as an orthogonal transform involving the encryption key. For example, an exclusive OR (XOR) calculation can be performed between the data to be transmitted and the encryption key to encode transmissions. Since the encryption engines 124 and the decryption engine 142 have knowledge of the final key value, data between them can be encoded, transferred, and decoded. In one embodiment of the present invention, only video data considered secure is protected. For example, the received video data may be sent encrypted through video sources, such as a DVD-ROM or a DTV tuner, before being sent to respective multimedia applications 110–113. Received data, which is encrypted, may be considered as secure and requiring further protection. Accordingly, encryption engine 124 of multimedia applications 110–113 can be used to only encrypt data originally encrypted.

In one embodiment, the value of the final key is dynamic. The value of the assigned seed key is used as an initial value for the encryption key, but the value of the final key is dynamically altered as new data is processed. If orthogonal encryption with a dynamic key is implemented, the final key can be altered periodically by applying a predetermined transform or a suitable mathematical algorithm to the value of the encryption key. For example, once decoder 122 decodes the data, a new encryption key can be generated using a combination of the value of the final key and the data generated by decoder 122. Using a dynamic encryption key, the communicating devices, multimedia applications 110–113 and hardware 140, alter the encryption keys, through encryption engines 124 and decryption engine 142, respectively, to provide added security. Alternatively, the function used for the orthogonal encryption can be dynamically altered to change the encryption scheme. In one embodiment, the value of the encryption key is generated by combining values of available encryption keys. For example, the values of the "third" and "fourth" key, in a list of available keys, are added together to determine the new key value to use.

In one embodiment, a driver 130 is used for encryption authentication and data buffering. Authentication engine 132, on driver 130, handles encryption authentication between authentication components 128, on multimedia applications 110–113, and decryption engine 142, on hardware 140. As previously discussed, authentication engine 132 checks the available key registers 143–146 on hardware 140. Once authentication engine 132 has selected a key register 143–146 for a multimedia application 110–113, authentication engine 132 marks the selected key register as used and does not assign it to another multimedia application.

An alternate embodiment selects encryption and decryption keys stored in binary files 120*a*–120*d* and hardware 140. Authentication engine 132 selects encryption keys without having knowledge of the values of the encryption keys. For example, authentication engine 132 can assign the "fifth" encryption key stored a set of encryption keys in binary file 120*a*, for DVD player 110. Accordingly, the value of the "fifth" key would be used by encryption engine 124 for encrypting data. Authentication engine 132 would then assign the "fifth" key to first key register 143 in hardware 140. Hardware 140 could then read the value of the "fifth" decryption key a set of decryption keys and store the value in first key register 143, allowing decryption engine 142 to properly decrypt data sent by DVD player 110.

Authentication engine can also assign a "second" encryption key in a set of encryption keys in binary file 120*b*, for encryption engine 124 in DTV tuner 111. Authentication engine 132 assigns the "second" decryption key, in a set of decryption keys in hardware 140, to second key register 144, allowing decryption engine 142 to decrypt data encrypted in DTV Tuner 111. Each of the encryption engines 124 of multimedia applications 110–113 can be assigned different encryption keys. In one embodiment, each of the corresponding key registers 143–146 is assigned different decryption keys, related to the assigned encryption keys.

In one embodiment, data buffers 136a–136d, on driver 130, are used to store data from multimedia applications 110–113, respectively, before sending the data to hardware 140. In one embodiment, each data buffer 136a–136d is used exclusively for data form one of the multimedia applications 110–113. Buffers 136a–136d store the encrypted data until hardware 130 is ready to process it. In one embodiment, hardware 140 sends a notification to driver 130 indicating hardware 140 is ready to process more data. Authentication engine 132 can also track the key registers 143–146 assigned to each of the data streams in buffers 136a–136d.

In one embodiment, if an error occurs during the transmission of the data from multimedia applications 110–113, authentication engine 132 can receive a request to re-initialize communications, wherein a new key register may be assigned. For example, while data from DVD player 110 may have been assigned to first key register 143, driver 130 may assign a new key register, such as second key register 144, to DVD player 110, in response to a request for re-authentication. However, some of the data stored in data buffer 136a may have been older data still assigned to first key register 143. Hardware 140 can continue to decrypt the data from data buffer 136a using the first key register 143 until all the old data has been read from data buffer 136a. Once the data encrypted with a new key, assigned to second key register 144, is sent to hardware 140, driver 130 can mark the old key register, first key register 143, as unused and hardware 140 can decrypt the data through the new key register, second key register 144.

If no key registers are available, the key registers 143–146 are all being used by multimedia applications 110–113, driver 130 can continue to use the old key register, programming the key register with the new seed key value as determined through negotiations between authentication engine 132 and authentication component 128 of multimedia application 110. If the old key register is used, errors may occur as old data from buffer 136a is decrypted, using a new encryption key value; however, it should be noted that data in other data buffers 136b–136d, from multimedia applications 111–113, can continue to be properly decrypted through respective key registers 144–146 in hardware 140. If no unused key register is available, driver 130 may allow data to be sent by a multimedia application of multimedia applications 110–113 using a predetermined encryption value known to both the multimedia application and hardware 140.

In one embodiment, driver 130 waits until all the encrypted data, based on the old encryption key value, in a data buffer, such as data buffer 136a, is sent and the data buffer is clear before authorizing new data to be encrypted. In another embodiment, driver 130 disables encryption for a short period of time, allowing time for the old data to be passed to hardware 140. In an alternate embodiment, hardware 140 is used to support the transition between data encrypted prior to the re-authentication request and the data encrypted after the re-authentication request. For example, in one embodiment, hardware 140 allows data to continue to be decrypted using the value in the first key register 143, while storing the new seed key value in an alternate register (not shown). Once all the old data has been received by hardware 140, the new seed value can be stored and processed using first key register 143.

In one embodiment, hardware 140 is used to process the data from multimedia applications 110–113 into displayable image data. Decryption engine 142 is used to decrypt the data received from data buffers 136a–136d. Decryption engine 142 reads key values stored in key registers 143–146. In one embodiment, data originating from multimedia applications 110–113 is decrypted using assigned key registers 143–146. For example, data from DVD player 110 can be decrypted using first key register 143, while data from first video player 113 can be decrypted using fourth key register 146.

Decrypted data by decryption engine 142 can be processed using a processing component 148. Processing component 148 is used to process the decrypted data into multimedia data. In one embodiment, the data sent by multimedia applications 110–113 includes transformed error data to be processed by processing component 148. The data may include data undergoes a transformation, such as IDCT coefficients of error data transformed using a discrete cosine transform (DCT). Processing component 148 can be an IDCT component used to process the IDCT coefficients to image data. The data sent by multimedia applications 110–113 can also include motion compensation vector data, wherein processing component 148 is used to process the motion compensation vectors to generate image data. The data sent by multimedia applications 110–113 may include other types of multimedia data being processed and processing component 148 may include other multimedia processing components without departing from the scope of the present invention.

In one embodiment, all data sent between multimedia applications 110–113 is protected. For example, data sent by multimedia applications 110–113 over a system bus may also be encrypted. It should be noted that the number of uniquely encrypted channels of data used might be limited by hardware 140. For example, the number of hardware registers, such as key registers 143–146, may be limited on hardware 140. In another embodiment, the decryption keys are stored and processed in driver 130, as discussed further in FIG. 4.

Figure 2:
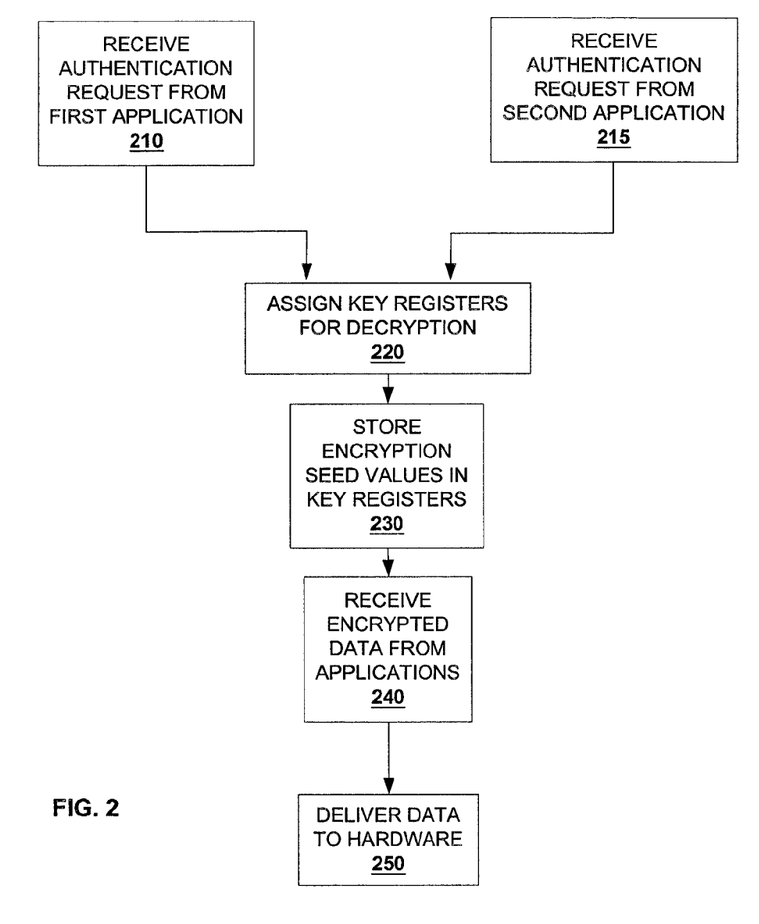
FIG. 2 is a flow diagram illustrating a method for encrypting multiple channels of multimedia data with individual encryption keys, according to one embodiment.

Referring now to FIG. 2, a flow chart illustrating a method of initiating an encrypted link between multiple multimedia applications and a hardware device is shown, according to one embodiment of the present invention. Data is sent from multimedia applications to be processed by hardware within an information handling system. A unique encryption key is assigned to each multimedia application, using a driver interface between the multimedia applications and the hardware.

In step 210, a driver receives an authentication request from a first multimedia application. In step 215, the driver receives an authentication request from a second multimedia application. In one embodiment, the multimedia applications generate video data to be processed by hardware for simultaneous real-time play back. The video data may be image data related to IDCT coefficients to be processed into displayable image data by hardware. The video data can also be motion compensation vectors that are to be processed into displayable image data. In one embodiment, the authentication is a negotiation scheme between multimedia applications and the driver. The authentication can include an identifier indicating which multimedia application is initiating the request for authentication. In another embodiment, the authentication is a list of available encryption keys on the multimedia application requesting the authentication. In step 220, the driver assigns a key register to each of the multimedia applications. For example, the driver can select a first key register in hardware for decrypting data from a first application and a second key register for decrypting data from a second application. In one embodiment, the driver only selects unused key registers. Each key register can only be assigned to one application at a time. The applications and assigned key registers can synchronously modify their encryption key values to dynamically encrypt and decrypt data.

A different register is assigned for each application. Each register can be used to decrypt data from a different multimedia application. For example, a first register can be used to store the value of the first key, used to decrypt data sent from the first multimedia application. A second register can be used to store the value of the second key, used to decrypt data sent from the second multimedia application. As described in FIG. 4, in another embodiment, the driver stores and updates the encryption key values to decrypt the data from the applications and re-encrypts the data before sending it to hardware.

In one embodiment, an application generates an encryption seed key value based upon the authentication between the application and the driver. The final encryption key value is then determined through manipulation of the encryption seed key. The final key value can then be manipulated in the application and hardware to dynamically alter the value of the final encryption key.

In an alternate embodiment, the driver selects the encryption key from a set of available keys on the multimedia applications and on the hardware. The sets of keys can be stored in the multimedia applications. The driver can read an index indicating which keys are stored on the applications. In one embodiment, the hardware also has a set of stored keys. The driver can query the hardware to determine which keys are available. In one embodiment, the driver assigns a different key to each application, dependent on the available keys. In one embodiment, the driver has no knowledge of key values. For example, the driver may assign the "second" key to the first multimedia application, without knowing what the value of the "second" key is. The first multimedia application would then read the value of the "second" key and use it for encryption.

In step 230, the driver assigns the encryption seed key values to the hardware. As previously discussed, in one embodiment, the value of the encryption seed keys are determined by the applications after the assignment of the key registers in step 220. Once the values of the encryption seed keys are stored, the applications and hardware manipulate the values to generate the final encryption key values to be used in encryption and decryption of the data. In one embodiment, the values of the final encryption key values are dynamically altered to change the values used to encrypt and decrypt the data. In an alternate embodiment, the values of the assigned keys are read by the hardware from a set of stored keys and stored in different registers.

Each of the multimedia applications encrypts their data using the assigned keys. The first application encrypts its data using a first key assigned by the driver and the second application encrypts its data using a second key assigned by the driver. In step 240, the driver receives the encrypted data sent from the multimedia applications. In one embodiment, the driver stores the encrypted data in separate buffers. The encrypted data is stored in the buffers until hardware is ready to process them. The hardware may send a notification requesting more data to be sent from the driver once it is ready for more data. For example, a hardware interrupt can be used to request more data from the driver.

In step 250, the driver sends encrypted data stored in the buffers to hardware to be processed. Once the hardware decrypts and processes the data sent by the driver, the driver can send more encrypted data from the buffers. If an error occurs during the transmission of data from one of the multimedia applications, a re-authentication from the multimedia application may be requested. In one embodiment, if a re-authentication request is issued, the driver assigns a new key register for decrypting the data, as discussed further in FIG. 3.

In one embodiment, the hardware receives the encrypted data and decrypts it using the key register currently assigned by the driver. The decrypted data is then sent to processing components in hardware. In one embodiment, the data sent by the multimedia applications relates to video data. The decrypted video data is processed and stored in frame buffers before being displayed.

As previously discussed, the encryption of data from the multimedia application may include a mathematical transformation of the data to be encrypted with the value of the encryption key, such as through an orthogonal transformation. The value of the key may be dynamic. If a dynamic key is used, the value of the key used by the multimedia applications and the hardware is periodically changed according to some predetermined scheme. For example, the value of the key may be incremented for every byte of data received. The value of the key may be transformed using the data itself. Alternatively, the encryption scheme used to encrypt the data with the value of the encryption key may be dynamic. It will be appreciated that alternative encryption schemes may be employed, other than those described herein, without departing from the scope of the present invention.

Figure 3:
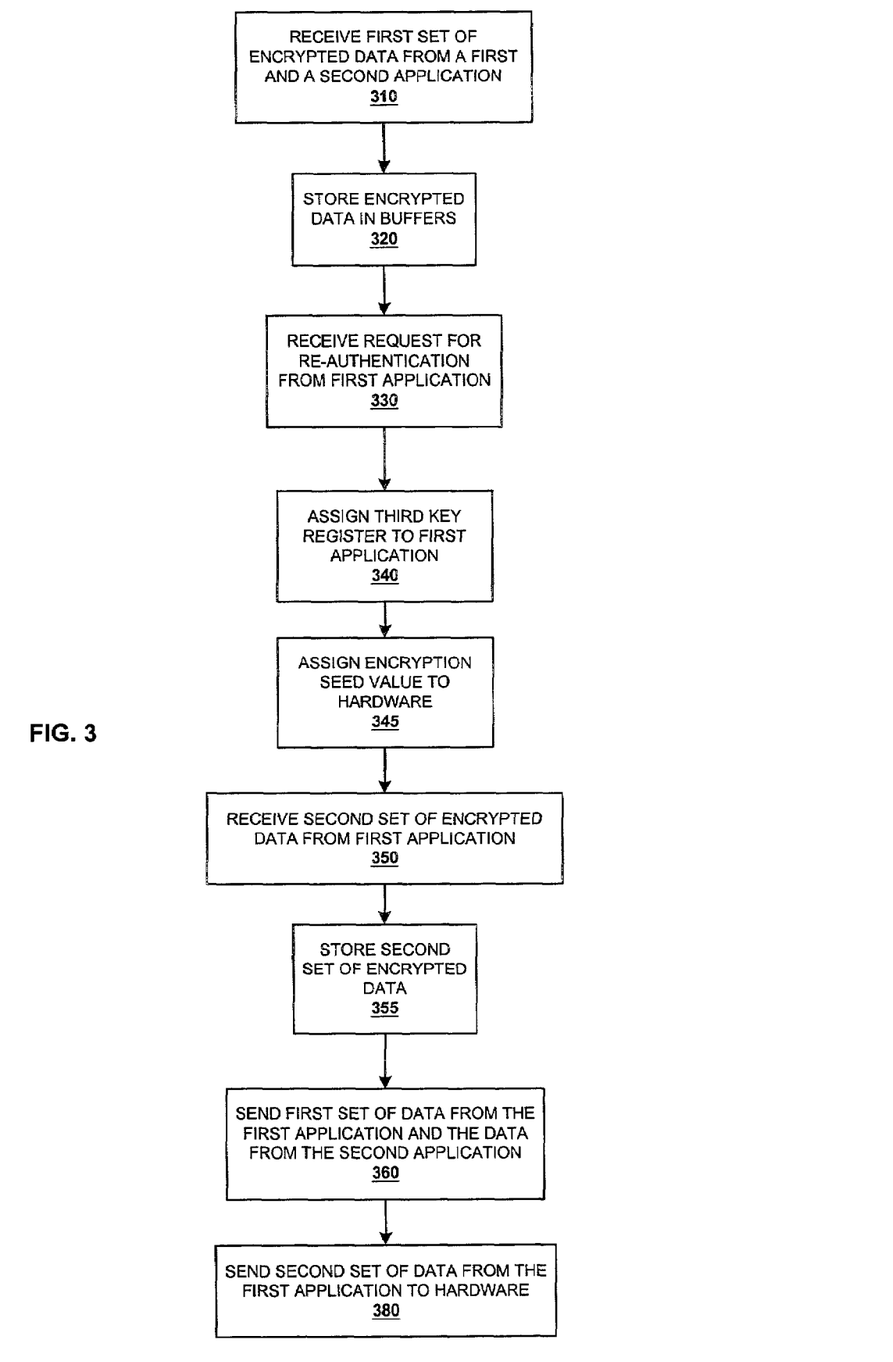
FIG. 3 is a flow diagram illustrating a method for handling requests for re-authentication from an application, according to one embodiment.

Referring now to FIG. 3, a flow diagram illustrating a method for handling re-authentication requests, according to one embodiment. If an error occurs while sending encrypted data from one of the multimedia applications, the application may submit a request for re-authentication form the driver. Re-authentication includes reinitializing the encryption in the multimedia application. The driver handles the re-authentication to ensure that errors in a data stream from one application will not affect data streams from another application.

In step 310, the driver receives a first set of encrypted data from a first and a second multimedia application. The encrypted data from the first multimedia application is decrypted in hardware using a first key register, assigned by the driver, as described in FIG. 2. Encrypted data from a second multimedia application is decrypted in hardware using a second key register assigned by the driver. As discussed in FIG. 2, the driver also assigns the encryption seed key values to the assigned hardware registers to process the data. The values of the encryption seed keys are stored in different hardware registers for each of the multimedia applications with encrypted data.

In step 320, the driver stores the encrypted data in buffers. The buffers allow the driver to store the encrypted data until the processing hardware is ready to receive more data. In step 330, the driver receives a request for re-authentication from the first multimedia application. As previously discussed, the request for re-authentication can be due to a communication error in data transmitted from one of the multimedia application. The communication error may be related to a checksum error related to incorrect bits or to interrupted communication with the driver. Re-authentication is used to reinitialize the encryption, allowing the driver to change the encryption key and/or assigned key register and reinitialize the communications link with the first application.

In one embodiment, dynamic encryption keys are used. The stored value of the decryption key in a hardware key register must be synchronized to the value of the encryption key used by the multimedia application. An error can force the hardware to no longer be synchronized with the multimedia application. In one embodiment, to recover from an error, the driver assigns a new key register. In step 340, the driver assigns a third key register to the first multimedia application, in response to the request for re-authentication from step 330. The first multimedia application uses the assigned key register for storing a new encryption seed key. In one embodiment, if no un-used key register is available, the first key register continues to be assigned to the first application. In step 345, the driver stores the new encryption seed key in the assigned key register. The hardware and the first multimedia application can then use respective values of the encryption seed key to generate a final encryption key value for processing data. In step 350, the driver receives a second set of data from the first multimedia application, assigned to be decrypted using the third key register. In step 355, the driver stores the encrypted data in the buffer used to store the first set of data from the first multimedia application.

In step 360, the driver sends the first set of data from the first multimedia application and the set of data from the second multimedia application to the hardware. While the first set of data from the first application is encrypted using a first encryption key value, assigned to the first key register, the second set of data from the first application is encrypted using a third encryption key, assigned to the third key register. In one embodiment, to allow data generated by the first application before the re-authentication request, pending data in the data buffers is decrypted using the first assigned key register. As previously discussed, if no un-used key registers are available, the first key register continues to be assigned to the second set of data from the first application; however, to allow pending data to still be decrypted, the new encryption seed key is not updated in the first key register until all pending data from the first set of data is processed. In another embodiment, the first key register is updated with the new encryption seed key value during the request for re-authentication. Accordingly, pending data will not be decrypted correctly; however, data streams from other applications can continue to be processed correctly.

In step 380, the driver sends the second set of data from the first application. In one embodiment, the hardware decrypts the data using the third key register. The data set from the second application can continue to be sent to the hardware. Since the key registers are stored in hardware, there is a hardware limitation on the number of multimedia applications that can be supported at one time. The limitation is due to the amount of space available for storing the decryption key values. In another embodiment, the driver handles the decryption of the data from the multimedia applications. The decryption keys can then be stored in the driver, increasing the space available for storing encryption keys, as discussed further in FIG. 4.

Figure 4:
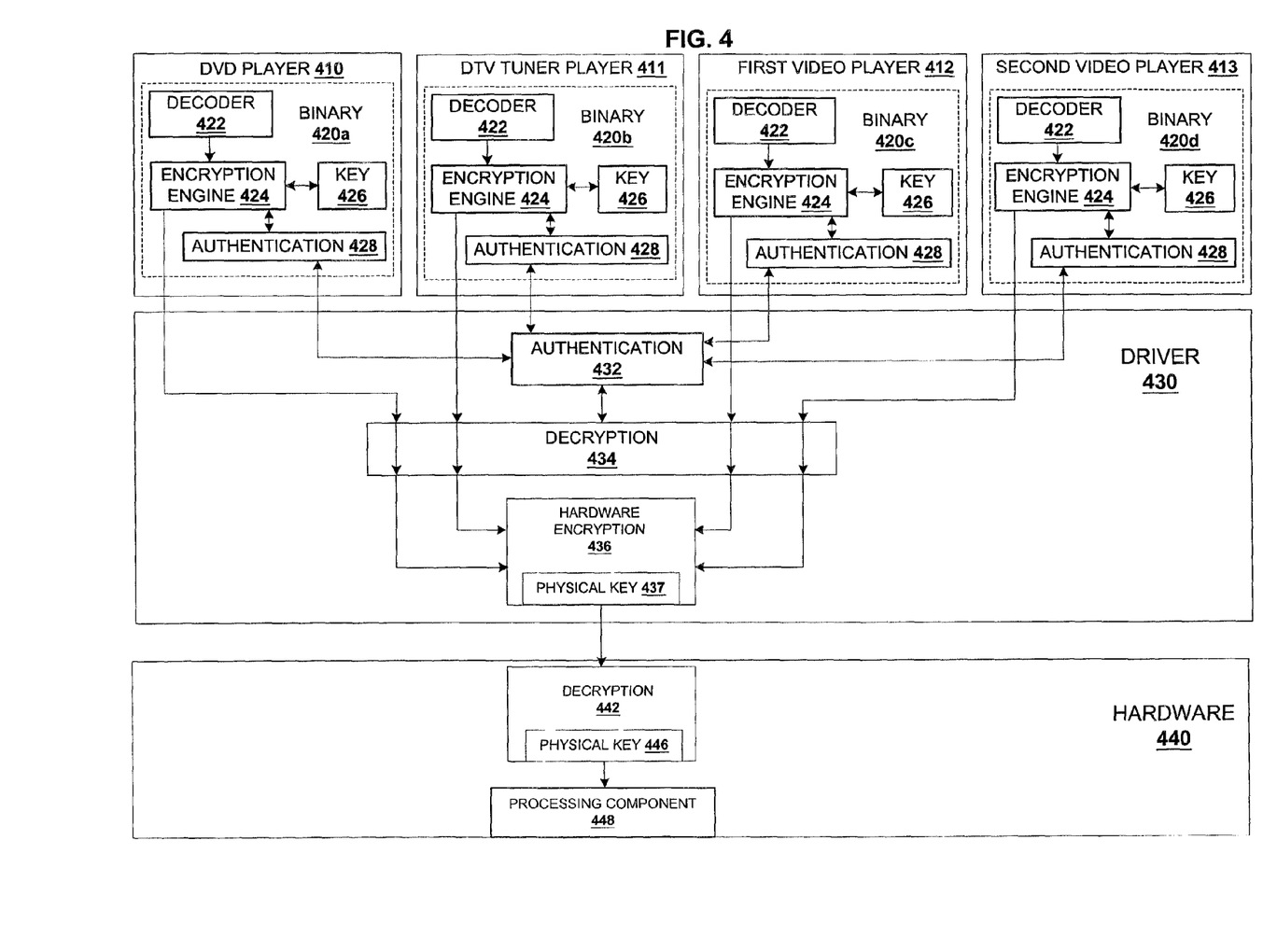
FIG. 4 is a block diagram illustrating a system for encrypting multiple channels of multimedia data by storing encryption keys in a driver, according to one embodiment.

Referring now to FIG. 4, a block diagram of a system for encrypting data from multiple applications is shown, according to one embodiment of the present invention. Data from different multimedia applications, DVD player 410, DTV tuner 411, first video player 412, and second video player 413, is encrypted using different encryption keys 426. A driver 430 decrypts the data using decryption key values stored in key registers (not shown) in driver 430. The data is re-encrypted by driver 430 before being sent to hardware 440.

In one embodiment, multimedia applications 410–413 generate video data to be processed by hardware 440. As previously discussed for FIG. 1, multimedia applications 410–413 may include a binary file, such as binary files 420*a*–420*d* for decoding the data into hardware commands, using decoder 422, and encrypting the decoded data, using encryption component engine 424. As previously discussed, final encryption key values are assigned to encryption engine 424, through authentication component 428. Authentication component 428 communicates with an authentication engine 432, on driver 430, to determine which of available encryption key registers to use for data encrypted through encryption engine 424. Driver 430 assigns key registers to each of the applications 410–413, requesting authentication. In one embodiment, once the authentication is complete, binaries 420*a*–420*d* determine an encryption seed key and send it to driver 430. The binaries 420*a*–420*d* and driver 430 manipulate the encryption seed key to determine final encryption keys for encrypting/decrypting the data. In one embodiment, the final encryption key values are never sent between the applications 410–413 and the driver 430. In one embodiment, driver 430 can generate new key registers for applications 410–413 if the available key registers are all being used.

In one embodiment, driver 430 decrypts the data from each of the multimedia applications using encryption key values within key registers in decryption engine 434. The decrypted sets of data are then encrypted using a hardware encryption engine 436, on driver 430. Hardware encryption engine 436 encrypts all the data using physical encryption key 437. The encrypted data is then sent to hardware 440. In one embodiment, the encryption is performed through a mathematical transformation of the data using physical encryption key 437, such as through an orthogonal transformation. It will be appreciated that other encryption schemes may be employed without departing from the scope of the present invention.

Hardware 440 decrypts the data sent by driver 430 using decryption component 442. Decryption component 442 uses a physical decryption key 446 to decrypt the data encrypted by hardware encryption engine 436 from driver 430. Once the data is decrypted, a processing component 448 on hardware 440 processes the data. In one embodiment, the data is related to IDCT coefficients. The processing component 448 processes the IDCT coefficients to generate displayable image data. In one embodiment, once processing component 448 has processed the data, the processed data is stored in a frame buffer. It will be appreciated that the data generated by multimedia applications 410–413 may be related to other multimedia data to be processed through processing component 448 without departing from the scope of the present invention. The system described herein represents an advantage over the system described in FIG. 1 in that the key registers for storing key values to decrypt the data from multimedia applications 410–413 are stored in driver 430, removing the hardware limitation on the number of key registers supported. The only decryption key stored in hardware 440 is physical decryption key 446. However, since decryption key values are stored in driver 430, driver 430 should be protected to ensure the driver is not tampered or the key values and decryption schemes in driver 430 are read.

The preceding descriptions have shown embodiments of the present invention used to initiate secure communications between an application and hardware within an information handling system. Authentication described herein can be performed with other types of applications and hardware devices. An embodiment of the present invention can also be implemented in systems other than computers, and can be used to control the transmission of data other than video data. The term "information handling system" refers to any system that is capable of processing information or transferring information from one source to another. An information handling system may be a single device, such as a computer, a personal digital assistant (PDA), a gaming device, a hand held computing device, a cable set-top box, an Internet capable device, such as a cellular phone, and the like. Alternatively, an information handling system may refer to a collection of such devices. For example, at least one embodiment of the present invention could be implemented in a compact disc (CD) player, or in other devices that might benefit from encrypted information transfer. It should now be appreciated by those skilled in the art that the present invention has the advantage that increased security can be achieved by providing for encryption between a plurality of applications and hardware. Another advantage, of at least one embodiment of the present invention, is that data from multiple applications may be encrypted for simultaneous real-time play back to satisfy a security requirement (for example, the Content Scrambling System).

In the preceding detailed description of the preferred embodiments, reference has been made to the accompanying drawings, which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising
   receiving encrypted data from a plurality of applications including a first encrypted data from a first application assigned to a first key register and a second encrypted data from a second application assigned to a second key register;
   assigning a third key register for decrypting data from the first application based upon a request for re-authentication;
   receiving a third encrypted data from the first application assigned to a third key register; and
   providing the first encrypted data to a first decryption source after receiving the third encrypted data.

2. The method as in claim 1, further including:
   providing the third encrypted data to the first decryption source; and
   providing the second encrypted data to a second decryption source.

3. The method as in claim 1, wherein the first decryption source decrypts the first encrypted data using a first encryption key stored in the first key register.

4. The method as in claim 1, wherein the request for re-authentication is a notification sent by the first application to a driver.

5. The method as in claim 1, wherein assigning the third key register includes locating an unused key register.

6. A method of providing multiple channels of secure multimedia data, the method comprising:
   receiving a first authentication request from a first multimedia application;
   receiving a second authentication request from a second multimedia application, wherein the second multimedia application is different than the first multimedia application;
   assigning a first key register to the first multimedia application based upon the first authentication request;
   assigning a second key register to the second multimedia application based upon the second authentication request;
   receiving first encrypted data based upon a first encryption key from the first multimedia application; and
   receiving second encrypted data based upon a second encryption key from the second multimedia application, wherein the first and second encrypted data are for simultaneous real-time play back.

7. The method as in claim 6, wherein the first and second applications are the same application.

8. The method as in claim 6, wherein the first and second applications are capable of providing a notification to the driver.

9. The method as in claim 8, wherein the notification includes the first and second authentication requests.

10. The method as in claim 8, wherein the notification includes a request for re-authentication.

11. The method as in claim 6, wherein the first and second multimedia applications relate to video applications.

12. The method as in claim 6, wherein assigning the first and second encryption keys includes selecting unused key registers.

13. The method as in claim 6, wherein the first and second key registers are stored in a driver.

14. The method as in claim 6, wherein the first and second key registers are stored in hardware.

15. The method as in claim 6, further including providing a binary file to developers of the first and second multimedia applications for inclusion in the first and second multimedia applications.

16. The method as in claim 15, wherein the binary file is for decoding commands generated in the first and second multimedia applications to hardware commands.

17. The method as in claim 15, wherein the binary file includes a set of encryption keys for encrypting data generated in the first and second applications.

18. A system comprising:
   a data processor having a first I/O buffer;
   a memory having a second I/O buffer coupled to the first I/O buffer of the data processor, the memory capable of storing code for:
      a driver for:
         receiving a first authentication request from a first multimedia application;
         receiving a second authentication request from a second multimedia application;
         assigning a first key register to the first multimedia application based upon the first authentication request;

assigning a second key register to the second multimedia application based upon the second authentication request;

receiving first encrypted data based upon a first encryption key from the first multimedia application; and receiving second encrypted data based upon a second encryption key from the second multimedia application, wherein the first and second encrypted data are for simultaneous real-time play back; and a hardware device for processing data generated by the first and second multimedia applications including:
a key register for storing a decryption key;
a decryption component for decrypting data using said decryption key; and
a processing component for processing multimedia data.

19. The system as in claim 18, wherein the first and second multimedia applications include a binary file for encrypting data generated within the first and second multimedia applications.

20. The system as in claim 19, wherein the binary file is further capable of decoding data generated within the first and second multimedia applications to generate hardware commands.

21. The system as in claim 18, wherein the driver is further capable of:
decrypting the first encrypted data based on the first encryption key;
decrypting the second encrypted data based on the second encryption key;
encrypting the first and second encrypted data using a hardware key to generate a third encrypted data; and
providing the third encrypted data to the hardware device.

22. The system as in claim 18, wherein the hardware device includes sets of key registers for storing a plurality of decryption keys and the hardware device is further capable of:
decrypting the first encrypted data based on the first encryption key; and
decrypting the second encrypted data based on the second encryption key.

23. A computer readable medium tangibly embodying a plurality of programs of instructions, the plurality of programs including:
a driver for:
receiving a first authentication request from the first multimedia application;
receiving a second authentication request from the second multimedia application;
assigning a first key register to the first multimedia application based upon the first authentication request;
assigning a second key register to the second multimedia application based upon the second authentication request;
receiving first encrypted data based upon a first encryption key from the first multimedia application; and
receiving second encrypted data based upon a second encryption key from the second multimedia application, wherein the first and second encrypted data are for simultaneous real-time play back.

24. The computer readable medium as in claim 22, wherein the plurality of programs further include a plurality of multimedia applications including the first multimedia application and the second multimedia application, wherein the second multimedia application is different from the first multimedia application.

25. The computer readable medium as in claim 24, wherein the plurality of multimedia applications include a binary file for encrypting data generated within the plurality of multimedia applications.

26. The computer readable medium as in claim 24, wherein the binary file is further capable of decoding data generated within the plurality of multimedia applications to generate hardware commands.

27. The computer readable medium as in claim 24, wherein the driver is further capable of:
decrypting the first encrypted data based on the first encryption key; and
decrypting the second encrypted data based on the second encryption key.

28. A method comprising:
providing a binary file to an application vendor, wherein the binary file is for:
providing a method of negotiating encryption with a device driver;
generating an encryption key value based upon a negotiation with the device driver; and
providing an encryption of data using a final key value.

* * * * *